United States Patent Office 3,505,408
Patented Apr. 7, 1970

3,505,408
HYDROFORMYLATION OF OLEFINS
Roy L. Pruett and James A. Smith, Charleston, W. Va., assignors to Union Carbide Corporation, a corporation of New York
No Drawing. Filed June 5, 1967, Ser. No. 645,561
Int. Cl. C07c 45/02
U.S. Cl. 260—604    5 Claims

ABSTRACT OF THE DISCLOSURE

Novel process involving the hydroformylation of olefinic compounds using ionic cobalt-containing complex compounds as the catalysts therefor, e.g.,

[Na][(CO)$_3$CoP($n$-C$_4$H$_9$)$_3$]

complex. Also claimed are certain novel ionic catalysts per se as well as the novel processes for producing the same.

---

This invention relates to the preparation of oxygenated organic compounds by the reaction of an olefinic compound with carbon monoxide and hydrogen in the presence of certain complex catalysts described hereinafter. In one aspect, the invention relates to an improved hydroformylation reaction in which oxygenated products containing a relatively high ratio of normal aldehydes to branched-chain aldehydes can be obtained. In other aspects, the invention relates to various novel hydroformylation catalysts per se and to processes for preparing such catalysts.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well-known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. Such processes are generally known in industry under varying names such as the Oxo process or reaction, oxonation, and/or hydroformylation.

One disadvantage of prior art hydroformylation processes is their dependence upon the use of catalysts such as cobalt octacarbonyl which require exceptionally high operative pressures to maintain such catalysts in their stable form. Another disadvantage is the difficulty in obtaining hydroformylation products which have a relatively high normal to branched product isomer ratio.

In a broad aspect, olefinic compounds are converted to oxygenated compounds, predominantly saturated aldehydes which have one more carbon atom than the olefinic compounds, by reacting said olefinic compounds in liquid phase, with carbon monoxide and hydrogen, at an elevated temperature, in contact with certain ionic salts as the catalysts therefor. By the practice of the novel process, it was oftentimes observed that the formation of alcoholic products was nil, or extremely low, whereas the normal to branched aldehydic product isomer ratio ranged upwards to about 7.7 to one. By optimizing the operative conditions, one would readily expect an even higher ratio of normal to branched aldehydic products.

The novel process is generally applicable to the hydroformylation of any aliphatic or cycloaliphatic compound having at least one ethylenic or olefinic carbon-to-carbon bond. Moreover, one can employ a sole olefinic compound or a mixture of olefinic compounds as reactant(s). Olefins such as ethylene, propylene, the butylenes, the pentylenes, the hexylenes, the octylenes, the dodecylenes, the octadecylenes, 1,7-octadiene, and higher molecular weight materials represent illustrations of suitable olefinic feeds. Suitable hydrocarbons include both branched- and straight-chain compounds having one or more carbon-to-carbon ethylenic or olefinic sites, especially those which contain from 2 to 20 carbon atoms. In the case of polyolefins, it is possible to hydroformylate only one of the olefinic sites or several or all of these sites. The unsaturated carbon-to-carbon olefinic bond may be terminal, i.e., between the alpha- and beta-carbon atoms as in 1-butene, or it may be internal as illustrated by 3-hexene.

The hydrocarbon alicyclic reactants include the monocyclic and polycyclic compounds which have at least one olefinic carbon-to-carbon bond, desirably those which contain up to 20 carbon atoms. This group can be adequately illustrated by cyclopentene, cyclohexene, cycloheptene, the methylcyclohexenes, the terpenes, 4-vinylcyclohexene, dicyclopentadiene, bicyclo[2.2.1]hepta-2,5-diene, tricyclo[6.2.1.0$^{2,7}$]undeca-4,9-diene, tetracyclo[6.2.1.1$^{3,6}$.0$^{2,7}$]dodeca-4,9-diene, pentacyclo[8.2.1.1$^{4,7}$.0$^{2,9}$.0$^{3,8}$]tetradeca-5,11-diene, and the like.

As indicated previously, the novel process is effected in the presence of certain ionic complex catalysts. These catalysts may, for convenience, be classified as ionic cobaltate salts. The cationic portion of the catalyst can be tetraalkylammonium or a Group I–A metal which has an atomic number greater than 2 and less than 56 in the Periodic Chart of the Elements[1]. Such cations are exemplified by lithium, sodium, potassium, rubidium, cesium, tetramethylammonium, tetraethylammonium, tetraisopropylammonium, tetra-n-butylammonium, tetra-2-ethylhexylammonium, tetraoctadecylammonium, and the like. Preferred cations are sodium, potassium, cesium, and tetra(C$_1$–C$_8$ alkyl)ammonium. Sodium is most preferred.

The anionic portion of the ionic salt catalysts comprises cobalt in complex combination with carbon monoxide and a phosphorus-containing ligand consisting essentially of a tertiary organo phosphorus compound in which the phosphorus is trivalent. Desirably each organo moiety of the phosphorus-containing ligand is composed of carbon and hydrogen atoms or carbon, hydrogen, and oxygen atoms. In its active form, the suitable salt catalysts will contain the cobalt component in a reduced valence state which will normally be a minus one (−1) valence state.

As used throughout this specification and claims, the term "complex" means a coordination compound formed by the union of one or more electronically rich molecules or atoms capable of independent existence with one or more electronically poor molecules or atoms, each of which is also capable of independent existence.

In the suitable ligands containing trivalent phosphorus comprised in the complex anionic moiety of the ionic salt catalyst, the phosphorus atom has one available or unshared pair of electrons. Any essential organic derivative of trivalent phosphorus with the foregoing electronic configuration is a suitable ligand for the cobalt-containing catalysts of the present process. When trivalent phosphorous has such an electronic configuration, it is capable of forming a coordinate bond with cobalt in its zero and minus one valent state. It thus will operate as a ligand in forming the desired anionic cobaltate complex.

Organic radicals of any size and composition may be bonded to the phosphorus atom. Contemplated within the scope of the invention, therefore, are trivalent phosphorus

---

[1] Handbook of Chemistry and Physics, 38th edition, Chemical Rubber Publishing Co., 1956–7 (pages 394–395).

ligands having acyclic, alicyclic, aromatic, and/or heterocyclic radicals, satisfying its three valences. Such radicals may contain functional groups such as carbonyl, carbonyloxy, nitro, amino, hydroxy, etc., groups, as well as saturated or unsaturated carbon-to-carbon linkages. These radicals, for example, the hydrocarbyl radicals, need not necessarily be the same and suitable trivalent phosphorus ligands comprise the mixed trihydrocarbylphosphines wherein two or more of the three hydrocarbyl substituents are different and can represent alkyl, cycloalkyl, aralkyl, alkaryl, aryl, and the like. Preferred hydrocarbyl radicals are those which contain from 1 to 18 carbon atoms, and the total number of carbon atoms in the trichlorocarbylphosphine ligand does not exceed 30 carbon atoms. Particularly preferred trivalent phosphorus ligands are the trialkylphosphines especially those in which each alkyl radical whether straight-chain or branched-chain in structure, contains from 1 to 10 carbon atoms.

Eminently desirable ionic catalysts which can be employed in the novel process are the aforedescribed Group-IA metal and tetraalkylammonium tricarbonyl(trihydrocarbylphosphine)cobaltate complexes. Of particular interest and commercial importance are those cobaltates in which the ligand is a trialkylphosphine since such ionic cobaltate catalysts gave a normal to branched aldehydic product isomer ratio ranging upwards to about 7.7 to one. In addition, it was observed that the alcoholic to aldehydic product formation, in many instances, was extremely low or negligible. These ionic cobaltates can be represented by the following formula:

$$M^+[(CO)_3CoP(R)_3]^-$$

wherein M represents sodium, lithium, potassium, rubidium, cesium, or tetraalkylammonium which preferably contains up to 8 carbon atoms in each alkyl moiety thereof, and wherein R represents alkyl which preferably contains up to 10 carbon atoms, e.g., methyl, ethyl, n-propyl, isopropyl, n-butyl, sec.-butyl, t-butyl, the hexyls, the octyls, the decyls, the dodecyls, the octadecyls, and the like.

Ilustrative ionic cobaltate complex catalysts include sodium tricarbonyl(trimethylphosphine)cobaltate,
sodium tricarbonyl(triethylphosphine)cobaltate,
sodium tricarbonyl(tripropylphosphine)cobaltate,
sodium tricarbonyl(tri-n-butylphosphine)cobaltate,
potassium tricarbonyl(tri-n-butylphosphine)cobaltate,
lithium tricarbonyl(tri-n-butylphosphine)cobaltate,
rubidium tricarbonyl(tri-n-butylphosphine)cobaltate,
cesium tricarbonyl(tri-n-butylphosphine)cobaltate,
tetraalkylammonium tricarbonyl(tri-n-butylphosphine)cobaltate,
sodium tricarbonyl(tri-2-ethylhexylphosphine)cobaltate,
potassium tricarbonyl(trioctadecylphosphine)cobaltate,
sodium tricarbonyl(tricyclopentylphosphine)cobaltate,
potassium tricarbonyl(triphenylphosphine)cobaltate,
sodium tricarbonyl(dipropyl-n-butylphosphine)cobaltate,
cesium tricarbonyl(di-n-octylisopropylphosphine)cobaltate,
potassium tricarbonyl(dicyclohexylethylphosphine)cobaltate, and the like.

The novel hydroformylation is effected in the presence of a catalytically significant quantity of the ionic cobaltate complexes. In general, a catalyst concentration in the range of from about 0.001 and lower, to about 10, and higher, weight percent, calculated on the weight of cobalt metal to the weight of olefin feed employed is suitable. A catalyst concentration in the range of from about 0.01 to about 5 weight percent of cobalt metal (based on the weight of the olefin feed) is preferred. It is thus apparent that the concentration of the catalyst can vary over a wide range. For optimum results, however, the concentration of the catalyst employed will depend, to a significant degree, on a correlation of factors such as operative temperature and pressure, the particular catalyst of choice, the ratio of the components comprising the synthesis gas, and other factors.

The hydroformylation reaction is conducted at an elevated temperature and over a wide pressure range. In general, a temperature range of from about 100° C., and lower, to about 300° C., and higher, is suitable. A preferred temperature range is from about 150° C. to about 200° C. The novel process is operable at pressures as low as one atmosphere or less. However, optimization of the process generally requires superatmospheric pressures, that is, greater than about one atmosphere and upwards to about 300 atmospheres, and higher. Pressures of from about 10 atmospheres to about 250 atmospheres are preferred.

The ratio of hydrogen to carbon monoxide employed in the hydroformylation reaction may vary over a wide range. Thus, the mole ratio of hydrogen to carbon monoxide can be less than one or greater than one, e.g., the ratio of hydrogen to carbon monoxide can be about 1:10 to about 10:1. Higher and lower ratios may also be employed. Desirable ratios of hydrogen to carbon monoxide are between about 1:3 to about 3:1.

As is well documented in the Oxo art, the reaction is effected for a period of time which is sufficient to hydroformylate an ethylenic bond in the olefinic reactant. Obviously, the residence time will vary depending on such variables as reaction temperature, olefin of choice, catalyst of choice, catalyst concentration, etc. In general, a reaction period of from about a couple of minutes to several hours should be sufficient to accomplish the hydroformylation reaction.

Solvents are not required in the practice of the novel process. If desired, however, one can employ normally-liquid organic solvents which are inert or which do not interfere to any substantial degree with the desired hydroformylation reaction under the operative conditions employed. Illustrative of such solvents include the saturated hydrocarbons, such as the pentanes, naphtha, kerosene, mineral oil, cyclohexane, etc. as well as the aromatic hydrocarbons and ethers as illustrated by benzene, xylene, toluene, diethyl ether, and the like.

The ionic complex catalysts are sensitive to or reactive with oxygen and consequently, obvious precautions should be taken to prevent exposure of the catalysts to the atmosphere. The catalyst life can be prolonged for extended periods of time during storage or in transit by maintaining the catalysts in an inert atmosphere such as argon, neon, nitrogen, and the like. During the hydroformylation reaction the synthesis gas (carbon monoxide and hydrogen) can be considered as an inert atmosphere with regard to the catalyst per se.

The preparation of the catalysts can be readily accomplished in the following manner. Sodium amalgam (the amalgam can contain up to 5 weight percent, and higher, of the alkali metal moiety in the alloy) and $$(CO)_6Co_2(PR_3)_2$$

complex are admixed together preferably in an inert, normally-liquid organic vehicle such as organic ethers as illustrated by tetrahydrofuran, ethylene glycol dimethyl ether, ethylene glycol diethyl ether, diethylene glycol dimethyl ether, etc., under an inert atmosphere. The resulting admixture is then allowed to stand, preferably with stirring or agitation, for a period of time ranging from several minutes to several days while maintaining the temperature below about 50° C. Thereafter, the mercury (along with any other solid materials) is removed from the resulting reaction product mixture such as by filtration under an inert atmosphere. There is obtained the novel ionic complex catalyst in the inert vehicle which can be employed as such in the hydroformylation reaction, or the inert vehicle can be removed by conventional methods as by distillation under reduced pressure.

The cobalt-containing reactant supra which is represented by the furmula $(CO)_6Co_2(PR_3)_2$ can be considered to be tertiary organo phosphorus-cobalt-carbonyl complexes in which the R moiety of the phosphorus-containing ligand ($PR_3$) is hydrocarbyl as exemplified by alkyl, cycloalkyl, and aryl, e.g., methyl, ethyl, isopropyl, n-butyl, sec.-butyl, t-butyl, the hexyls, the dodecyls, the octadecyls, cyclopentyl, cyclohexyl, cycloheptyl, phenyl, tolyl, xylyl, naphthyl, etc.; or hydrocarbyloxy as exemplified by alkoxy, cycloalkoxy, and aryloxy, e.g., methoxy, n-propoxy, n-butoxy, the nonoxys, the dodecoxys, cyclopentoxy, cyclohexoxy, cycloheptoxy, phenoxy, toloxy, naphthyloxy, etc. It is preferred that R be alkyl of 1 to 10 carbons with n-butyl being most preferred.

Other alkali metal amalgams can be employed in the preparation of the catalyst. Thus, one could use potassium amalgam or lithium amalgam. The operative temperature can be below about 0° C. (providing a liquid phase is maintained) to about 60° C., preferably from 10° C. to about 30° C. when employing the alkali metal amalgams. No criticality appears to be attached to the pressure. For obvious reasons, it is desirable to effect the reaction of alkali metal amalgam and $(CO)_6Co_2(PR_3)_2$ complex at ambient temperature and pressure, e.g., about 20°–25° C. and approximately one atmosphere.

The proportion of alkali metal amalgam to $(CO)_6Co_2(PR_3)_2$

A 3-liter high pressure bomb was cooled in Dry Ice-acetone, and charged with 84 grams propylene in 500 ml. nitrogen-purged, reagent grade toluene. The catalyst was added under a nitrogen atmosphere, and the bomb placed in a rocker and warmed to room temperature, at which temperature the bomb was pressurized with 600 p.s.i. carbon monoxide and 1800 p.s.i. hydrogen. The bomb was heated with rocking to reaction temperature and maintained at that temperature until the rate of gas take-up had markedly decreased, at which time the bomb was cooled to room temperature and vented.

The reaction mixture was distilled at room temperature under vacuum to separate butyraldehyde products from the catalyst residue. The distillate was analyzed directly for isomer ratio by gas chromatography. The butyraldehyde yield was determined from nuclear magnetic resonance spectral analysis of the distillate.

EXAMPLES 1–11

In Examples 1–11, various cobalt-containing catalysts were employed in the hydroformylation of propylene. The pertinent data are set forth in Table I infra.

TABLE I

| Example | Catalyst | Concentration [1] | Temp., °C. | Time (min.) [2] | n:iso Ratio [3] | Yield [4] |
|---|---|---|---|---|---|---|
| 1 | [Na][(CO)₃CoP(n-C₄H₉)₃] [5] | 0.3 | 185 | 48 | 7.7 | 71 |
| 2 | [(C₂H₅)₄N][(CO)₃CoP(n-C₄H₉)₃] | 0.34 | 190 | 22 | 3.2 | 59 |
| 3 | [(CO)₃Co(P(n-C₄H₉)₃)₂][φ₄B] [6] | 0.34 | 172 | 33 | 7.8 | 46 |
| 4 | [Na][Co(CO)₄] [5] | 0.3 | 185 | 21 | 1.8 | 74 |
| 5 | [(C₂H₅)₄N][Co(CO)₄] | 0.35 | 200 | 4 | 1.7 | 54 |
| 6 | [Na][(CO)₃CoP(Oφ)₃] [5] | 0.3 | 185 | 18 | 1.9 | 88 |
| 7 | Co₂(CO)₆[P(Oφ)₃]₂ | 0.16 | 140 | 13 | 2.8 | 82 |
| 8 | Co₂(CO)₆[P(φ)₃]₂ | 0.17 | 155 | 4 | 2.3 | 81 |
| 9 | Co₂(CO)₆[φ₂P(Oφ)]₂ | 0.17 | 140 | 12 | 2.8 | 88 |
| 10 | Co₂(CO)₆[φP(i-C₃H₇)₂]₂ | 0.17 | 145 | 18 | 2.9 | 84 |
| 11 | Co₂(CO)₈ | 0.16 | 140 | 7 | 2.4 | 92 |

[1] Mole percent of catalyst based on propylene reactant.
[2] Reaction time is based on the time required for the CO+H₂ pressure to drop 80 percent.
[3] Ratio of n-butyraldehyde to isobutyraldehyde.
[4] Yield of total butyraldehydes based on propylene.
[5] Catalyst dissolved in ethylene glycol dimethyl ether.
[6] The phenyl radical is represented by φ.

can vary over a wide range. Theoretically, it takes 0.5 mole of $(CO)_6Co_2(PR_3)_2$ and one mole of the amalgam to give the ionic complex catalyst $[M][(CO)_3Co(PR_3)]$ wherein M represents the alkali metal cation. In actual practice, however, one can employ a molar excess or deficiency of $(CO)_6Co_2(PR_3)_2$ with respect to the amalgam, e.g., from about 0.1 to about 10, and higher, mols of $(CO)_6Co_2(PR_3)_2$ per mol of alkali metal. It is to be understood that the invention is not to be limited by the proportions of the reactants unless such limitations are specifically set out in the claims. In general, it is desirable to employ a molar ratio of $(CO)_6Co_2(PR_3)_2$ to alkali metal which is between about 0.4:1 to 2:1. The mercury by-product as well as excess amalgam, if any, can be removed from the reaction product mixture by obvious expediencies such as filtration.

The tetrahydrocarbylammonium tricarbonyl(triorganophosphorus)cobaltate complexes can be prepared by reacting [alkali metal] [(CO)₃CoPR₃] complex with, for example, tetraalkylammonium chloride, under an inert atmosphere, and preferably in an inert, normally, liquid organic vehicle. The operative conditions noted above likewise apply here. The resulting reaction product mixture (generally as a solution) can be concentrated to dryness, e.g., under a vacuum at moderately elevated temperatures, e.g., about 40°–50° C. Water-washing the resulting residue, followed by filtration, gives a solid product essentially devoid of water-soluble by-products, if any. Washing this solid with petroleum ether yields an air-sensitive solid product, i.e., the complex [(alkyl)₄N] [(CO)₃CoPR₃].

In the operative examples hereinafter, the procedure employed in the hydroformylation reaction was as follows:

EXAMPLE 12

In an analogous manner to Example 1 supra, when 1-octene is employed in lieu of propylene, there is obtained a mixture of nonanal isomers.

EXAMPLE 13

In an analogous manner to Example 1 supra, when 1-hexane is employed in lieu of propylene and

[K][(CO)₃CoP(n—C₄H₉)₃]

is used as the catalyst, there is obtained a mixture of heptanal isomers.

EXAMPLE 14

In an analogous manner to Example 1 supra, when 1-butene is employed in lieu of propylene and

[Na][(CO)₃CoP(C₂H₅)₃]

is used as the catalyst, there is obtained a mixture of pentanal isomers.

EXAMPLE 15

In an analogous manner to Example 4 supra, when [Na][(CO)₃CoPφ₃] is employed in lieu of

[Na][(CO)₃CoP(n—C₄H₉)₃]

there is obtained a mixture comprising n-butyraldehyde and isobutyraldehyde.

EXAMPLE 16

(A) A one-liter, 3-necked indented flask was charged with one weight percent sodium-amalgam (300 grams), (CO)₆Co₂[P(n—C₄H₉)₃]₂ (13.8 grams, 0.02 mole), and ethylene glycol dimethyl ether (400 ml.). The mixture was rapidly stirred under an argon atmosphere for 3 hours, then filtered under a nitrogen atmosphere to remove the mercury. There was obtained a light-yellow solution which contained [Na][(CO)$_3$CoP(n—C$_4$H$_9$)$_3$] in ethylene glycol dimethyl ether. Distillation under a pressure less than one mm. of Hg (nitrogen) moderate elevated temperature gave solid [Na][(CO)$_3$CoP(n—C$_4$H$_9$)$_3$] as the product which is reactive with oxygen. This product was identified by proper carbonyl IR absorption, both in solution and as a solid, metathetical reaction to produce other salts (nickel o-phenanthrolin complex, etc.) and by proper C=H IR absorption of the solid product.

(B) Repeating the procedure of (A) supra but using potassium-amalgam and (CO)$_6$Co$_2$[P(C$_2$H$_5$)$_3$]$_2$ gives solid [K][(CO)$_3$CoP(C$_2$H$_5$)$_3$].

EXAMPLE 17

Under a nitrogen atmosphere, 40 percent of the yellow solution of Example 16A, i.e.,

[Na][(CO)$_3$CoP(n—C$_4$H$_9$)$_3$]

in the diglyme, was added to a solution of (C$_2$H$_5$)$_4$N·Cl (2.5 g.; 0.015 mole) in water (100 ml.). The resulting solution was concentrated to dryness under vacuum at about 40°–50° C., and the solid residue was washed with water and filtered. The solid product was then washed with petroleum ether. There was obtained 3.8 grams light-tan, extremely air sensitive product identified as discussed previously as [(C$_2$H$_5$)$_4$N][(CO)$_3$CoP(n—C$_4$H$_9$)$_3$].

What is claimed is:

1. A process for the production of aldehydes and alcohols which comprises contacting an olefinic hydrocarbon compound of 2 to 20 carbon atoms with carbon monoxide and hydrogen; at a temperature in the range of from about 100° C. to about 300° C. and under a pressure greater than about one atmosphere to about 300 atmospheres; in the presence of an ionic complex catalyst of the formula $$M^+[(CO)_3CoP(R)_3]^-$$

wherein M is of the group consisting of sodium, lithium, potassium, rubidium, cesium, and tetraalkylammonium, and wherein R represents alkyl; thereby reacting said olefinic hydrocarbon compound with said carbon monoxide and hydrogen wit hthe formatiion of aldehydes and alcohols having one more carbon atom than said olefinic hydrocarbon compound.

2. The process of claim 1 wherein said pressure is in the range of from about 10 atmospheres to about 250 atmospheres.

3. The process of claim 2 wherein said catalyst is sodium tricarbonyl(trialkylphosphine)cobaltate complex.

4. The process of claim 3 wherein said catalyst is sodium tricarbonyl(tri-n-butylphosphine)cobaltate complex.

5. The process of claim 4 wherein said olefinic hydrocarbon is propylene.

References Cited

UNITED STATES PATENTS

| | | |
|---|---|---|
| 3,102,899 | 9/1963 | Cannell. |
| 3,168,553 | 2/1965 | Slaugh. |
| 3,310,576 | 3/1967 | Mertzweiller et al. |

OTHER REFERENCES

Hieber et al.: Chem. Ber., vol. 94 (1961), pp. 1417–1425.

BERNARD HELFIN, Primary Examiner

U.S. Cl. X.R.

260—598; 252—431; 260—439